United States Patent
Nakaura et al.

(10) Patent No.: US 6,291,567 B1
(45) Date of Patent: Sep. 18, 2001

(54) FLAME RETARDANT ANTISTATIC POLYESTER RESIN COMPOSITION

(75) Inventors: Misuzu Nakaura, Hirakata; Kimihiko Nakano, Kobe, both of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/166,912

(22) Filed: Oct. 6, 1998

(30) Foreign Application Priority Data

Oct. 6, 1997 (JP) .................................................. 9-289099
Feb. 9, 1998 (JP) ................................................. 10-044602

(51) Int. Cl.$^7$ ...................................................... C08K 3/10
(52) U.S. Cl. ................ 524/412; 252/518.1; 252/519.33; 524/108; 524/177; 524/409; 524/410; 524/449
(58) Field of Search .................................... 524/409, 410, 524/412, 449, 108, 177; 252/518.1, 519.33

(56) References Cited

U.S. PATENT DOCUMENTS

| | | | |
|---|---|---|---|
| 4,123,578 | * 10/1978 | Perrington et al. | 428/206 |
| 4,548,964 | 10/1985 | Yoshida et al. | 523/455 |
| 5,115,016 | * 5/1992 | Dickens et al. | 524/513 |
| 5,194,477 | * 3/1993 | Liu et al. | 524/382 |
| 5,286,771 | * 2/1994 | Smith | 524/78 |
| 5,367,011 | * 11/1994 | Walsh et al. | 524/417 |
| 5,648,411 | * 7/1997 | Gallucci et al. | 524/156 |
| 5,883,178 | * 3/1999 | Ohmoto et al. | 524/469 |
| 5,929,154 | * 7/1999 | Masuyama et al. | 524/409 |
| 5,965,655 | * 10/1999 | Mordecai et al. | 524/456 |

FOREIGN PATENT DOCUMENTS 4093349 3/1992 (JP).

* cited by examiner

Primary Examiner—Judy M. Reddick
(74) Attorney, Agent, or Firm—Leydig, Voit & Mayer, Ltd.

(57) ABSTRACT

A flame retardant antistatic polyester resin composition having excellent flame resistance, antistatic properties, mechanical strength and heat resistance, which includes a thermoplastic polyester and, per 100 parts by weight of the thermoplastic, 1 to 35 parts by weight of a bromine-containing flame retardant, 0.1 to 5 parts by weight of an antimony compound, 3 to 12 parts by weight of a conductive carbon black, 0.05 to 30 parts by weight of a low molecular weight polyester compound and 0.1 to 5 parts by weight of a metal salt of an ionic hydrocarbon copolymer. The resin composition may further contain a reinforcing filler, a crystallizing accelerator or a polyfunctional compound reactive with either or both of hydroxyl groups and carboxyl groups.

12 Claims, No Drawings

FLAME RETARDANT ANTISTATIC POLYESTER RESIN COMPOSITION

BACKGROUND OF THE INVENTION

The present invention relates to a flame retardant, antistatic polyester resin composition, and more particularly to a polyester resin composition having excellent antistatic properties, flame resistance, heat resistance and mechanical strength and suitable for various uses, particularly as electric and electronic equipment parts.

Thermoplastic polyester resins, typically polyethylene terephthalate and polytetramethylene terephthalate, have been widely used as fibers, films, molding materials and the like, since they have excellent mechanical and electrical properties.

Reinforced thermoplastic polyester resin compositions have greatly improved mechanical strength and heat resistance and are obtained by incorporating a reinforcing filler such as glass fiber into these thermoplastic polyester resins. The reinforced resin compositions are suitable as a material for functional parts.

In recent years, a demand for fire safety increases more and more, particularly in the field of electric and electronic equipment parts, in addition to properties such as mechanical strength and heat resistance. Thus, investigation on flame retardation of resins has been made and flame retardant resin compositions incorporated with various flame retardants have been put on the market.

As to flame retardation of thermoplastic polyester resins, it is proposed, for example, to add a halogenated polystyrene resin (as disclosed in Japanese Patent Publications Kokai No. 50-92346, No. 4-198357 and No. 5-140427), to add a halogenated bisphenol A type epoxy resin (as disclosed in Japanese Patent Publications Kokai No. 50-35257 and No. 62-15256), and to add a high molecular weight halogenated bisphenol A type phenoxy resin.

On the other hand, it is known that thermoplastic resin compositions containing a polyester resin are easy to be charged. This tendency does not change even in the case of the above-mentioned flame retardants being incorporated therein. It is well known to add a conductive carbon black to the compositions in order to impart an antistatic property to the compositions, as disclosed for example in Japanese Patent Publication Kokai No. 49-99734.

However, in case that the antistatic property is imparted to flame retarded polyester resin compositions by incorporation of conductive carbon black, the resins are deteriorated by conductive carbon black, thus resulting in lowering of the mechanical strength. Therefore, it is required to use the conductive carbon black in an amount of as small as possible. On the other hand, the conductive carbon black has to be uniformly dispersed in the resin compositions. If the carbon black has not been uniformly dispersed, no desired electric resistance is obtained, and also a variation in electric resistance value generates. Further, the plastication characteristics of the compositions during molding processing does not become constant and, therefore, for example, in case of injection molding, the metering time is not stabilized, so flash and short shot nonuniformly generate in the obtained moldings, resulting in increase of fraction defective.

A general procedure which has been conventionally adopted to cope with uniform dispersion of conductive carbon black is to raise the number of rotations of a screw in extruder or other mixing machines and in molding to achieve a high degree of kneading. However, in that case, resins may be deteriorated by shearing due to the screw to remarkably lower the mechanical strength. Thus, it is desired that the mechanical strength is not lowered, even if a conductive carbon black is uniformly dispersed in thermoplastic resins to impart the antistatic property to the resins.

It is an object of the present invention to provide an antistatic thermoplastic polyester resin composition having high heat resistance, high mechanical strength and high flame retardancy.

A further object of the present invention is to provide a flame retardant, antistatic polyester resin composition, according to which a desired electric resistance value can be obtained by incorporation of a small amount of conductive carbon black while maintaining high heat resistance, flame retardancy and mechanical strength and, moreover, which has stable plastication characteristics, so the fraction defective can be remarkably reduced.

A still further object of the present invention is to provide a reinforced polyester resin composition to which a flame retardancy and an antistatic property are imparted by incorporation of a flame retardant and a conductive carbon black without impairing the physical properties such as mechanical strength.

These and other objects of the present invention will become apparent from the description hereinafter.

SUMMARY OF THE INVENTION

It has been found that if a low molecular weight polyester compound and a metal salt of an ionic hydrocarbon copolymer, e.g., ionomer, are incorporated in specific proportions into thermoplastic polyester resins together with a bromine-containing flame retardant, an antimony compound, a conductive carbon black and optionally a reinforcing filler, (1) the dispersibility of conductive carbon black into the polyester resins can be remarkably improved, (2) whereby a required level of electric resistance value can be obtained by incorporation of a smaller amount of conductive carbon black than conventionally used, and a variation of the electric resistance value can be greatly reduced, (3) the plastication characteristics of the obtained compositions is made stable, so the quality of the obtained moldings is stabilized, and (4) since the extruding and molding processing can be conducted under milder conditions than conventional conditions, deterioration of the strength of the resins can be greatly suppressed.

In accordance with the present invention, there is provided a flame retardant antistatic polyester resin composition comprising:

(A) a thermoplastic polyester,
(B) 1 to 35 parts of a bromine-containing flame retardant,
(C) 0.1 to 5 parts of an antimony compound,
(D) 3 to 12 parts of a conductive carbon black,
(E) 0.05 to 30 parts of a low molecular weight polyester compound, and
(F) 0.1 to 5 parts of a metal salt of an ionic hydrocarbon copolymer, wherein said all parts of (B) to (F) are parts by weight per 100 parts by weight of said polyester (A).

The composition may further contain at least one member selected from the group consisting of (G) a reinforcing filler, (H) a crystallizing accelerator and (I) a polyfunctional compound reactive with either one or both of hydroxyl group and carboxyl group.

The composition of the present invention has excellent flame retardancy, antistatic property, mechanical properties and heat resistance. The variation in electric resistance value of the composition is very small, and the composition also has stable plastication characteristics in molding processing, so molded articles having an improved quality can be industrially produced with a reduced fraction defective.

DETAILED DESCRIPTION

The thermoplastic polyester resins (A) used in the present invention are those obtained according to known methods from at least one carboxylic acid component having a valency of at least 2, especially an acid component composed mainly of an aromatic carboxylic acid, and at least one alcohol component having a valency of at least 2, preferably terephthalic acid-based polyester resins obtained from an acid component comprising terephthalic acid or its ester-formable derivatives and a glycol component comprising a glycol having 2 to 10 carbon atoms or its ester-formable derivatives. Typical examples of the thermoplastic polyester resin are, for instance, polyethylene terephthalate, polypropylene terephthalate, polytetramethylene terephthalate, polyhexamethylene terephthalate and other known polyalkylene terephthalates.

The terephthalic acid-based polyester resins may contain at least one copolymerizable component, so long as the flame resistance, antistatic property and moldability of the polyester resin compositions of the present invention are not impaired. Examples of such copolymerizable components are carboxylic acids, e.g., a bivalent or higher valent aromatic carboxylic acid having 8 to 22 carbon atoms excepting terephthalic acid, a bivalent or higher valent aliphatic carboxylic acid having 4 to 12 carbon atoms and a bivalent or higher valent alicyclic carboxylic acid having 8 to 15 carbon atoms, and their ester-formable derivatives; and compounds containing at least two hydroxyl groups in their molecules, excepting the above-mentioned glycols such as ethylene glycol, propylene glycol and butanediol, e.g., an aliphatic compound having 3 to 15 carbon atoms, an alicyclic compound having 6 to 20 carbon atoms or an aromatic compound having 6 to 40 carbon atoms, and their ester-formable derivatives.

Examples of the carboxylic acid are, for instance, isophthalic acid, naphthalenedicarboxylic acid, bis(p-carboxyphenyl)methane anthracenedicarboxylic acid, 4,4'-diphenyldicarboxylic acid, 1,2-bis(phenoxy)ethane-4,4'-dicarboxylic acid, adipic acid, sebacic acid, azelaic acid, dodecanedioic acid, maleic acid, trimesic acid, trimellitic acid, pyromellitic acid, 1,3-cyclohexanedicaboxylic acid, 1,4-cyclohexanedicaboxylic acid, decahydronaphthalenedicarboxylic acid, and ester-formable derivatives of them.

Examples of the hydroxyl group-containing compound are, for instance, hexanediol, decanediol, neopentyl glycol, cyclohexanedimethanol, cyclohexanediol, 2,2'-bis(4-hydroxyphenyl)propane, 2,2'-bis(4-hydroxycyclohexyl) propane, hydroquinone, glycerol, pentaerythritol, and ester-formable derivatives of them.

An oxy-acid such as p-hydroxybenzoic acid or p-hydroxyethoxybenzoic acid, its ester-formable derivative, and a cyclic ester such as ε-caprolactone can also be used as the comonomer. Further, there can be used a thermoplastic polyester resin wherein a polyalkylene glycol segment such as polyethylene glycol, polypropylene glycol, poly(ethylene oxide-propylene oxide) block and/or random copolymer, polyoxyethylene bisphenol A ether or polytetramethylene glycol is partly copolymerized in the polymer chain.

The content of the copolymerizable component in the polyester resin (A) is at most about 20% by weight, preferably at most about 15% by weight, more preferably at most about 10% by weight. If the content is more than 20% by weight, a balance between physical properties such as mechanical strength and heat resistance tends to lower.

A thermoplastic polyester containing ethylene terephthalate and/or tetramethylene terephthalate units as a main component is preferred in the present invention from the viewpoint of a balance between mechanical properties and moldability.

The thermoplastic polyester used in the present invention has a logarithmic viscosity of at least 0.35 dl/g, preferably 0.4 to 2.0 dl/g, more preferably 0.45 to 1.5 dl/g, measured at 25° C. in a mixed solvent of phenol/1,1,2,2-tetrachloroethane=1/1 by weight.

In the present invention, the thermoplastic polyesters may be used alone or in admixture thereof.

Known bromine-containing flame retardants such as commercially available flame retardants can be used as the component (B) in the present invention. Examples thereof are, for instance, brominated polystyrene, brominated epoxy resin, brominated phenoxy resin, brominated imide, brominated polycarbonate, polybromobenzyl acrylate, brominated diphenyl alkane, and the like. Brominated polystyrene, brominated diphenyl alkane and brominated phenoxy resin are particularly preferred. The bromine-containing flame retardants may be used alone or in admixture thereof. The halogen content of the bromine-containing flame retardant used in the present invention is preferably at least 20% by weight, especially at least 25% by weight. If the halogen content is less than 20% by weight, the flame retardancy is insufficient.

The amount of the flame retardant (B) varies depending on the kind of the flame retardant, and is usually from 1 to 35 parts by weight, preferably 3 to 30 parts by weight, more preferably 5 to 25 parts by weight, per 100 parts by weight of the thermoplastic polyester (A). If the amount is less than 1 part by weight, no sufficient flame resistance is obtained, and if the amount is more than 35 parts by weight, the mechanical strength is lowered.

The antimony compound (C) is used as a flame retarding assistant. The flame retarding effect is remarkably raised by using the bromine-containing flame retardant (B) in combination with the antimony compound (C). Any of known antimony compounds used for this purpose can be used in the present invention. Examples of the antimony compound are, for instance, antimony trioxide, antimony tetraoxide, antimony pentoxide, sodium antimonate, antimony tartrate, and the like. The antimony compounds may be used alone or in admixture thereof. The amount of the antimony compound is from 0.1 to 5 parts by weight, preferably 0.5 to 4 parts by weight, more preferably 1 to 3.5 parts by weight, per 100 parts by weight of the thermoplastic polyester (A). If the amount is less than 0.1 part by weight, no sufficient flame resistance is obtained, and if the amount is more than 5 parts by weight, the flame resistance and mechanical strength are lowered.

It is well known from publications or literatures that the flame resistance is the most efficiently obtained when the bromine-containing flame retardant is used with the antimony compound in a Br/Sb ratio of 3/1 by weight, and such a ratio has been generally adopted. However, in the present invention, it is desirable to adjust the Br/Sb ratio within the range of 5.5/1 to 35.0/1 by weight, preferably 6.0/1 to 32.0/1 by weight, more preferably 6.5/1 to 30.0/1 by weight. If the Br/Sb ratio is less than 5.5/1 by weight, particularly the carbonized combustion time (glowing time) tends to become longer. If the Br/Sb ratio is more than 35.0/1 by weight, the flame retarding effect becomes insufficient and, therefore, the overall burning time itself tends to become longer. In both cases, there is a tendency that a high level of flame resistance which meets the UL94V standard is not obtained.

The conductive carbon black (D) is used to impart an antistatic property to the obtained resin compositions. Known conductive carbon blacks, e.g., conductive acetylene blacks and furnace blacks having a DBP oil absorption (volume ml of dibutyl phthalate absorbed per 100 g of carbon black) of 100 to 700 ml/100 g and a particle size of 1 to 500 m$\mu$, can be used in the present invention. Such carbon blacks are commercially available, e.g., Ketjen Black EC and Ketjen Black EC600JD made by Ketjen Black International Co. The conductive carbon blacks may be used alone or in admixture thereof. The conductive carbon black is used in an amount of 3 to 12 parts by weight, preferably 4 to 11 parts by weight, more preferably 4.5 to 10 parts by weight, per 100 parts by weight of the thermoplastic polyester (A). If the amount of carbon black is less than 3 parts by weight, the antistaticity is not sufficient, and if the amount is more than 12 parts by weight, the obtained compositions are hard to be pelletized by extrusion and, in addition, the mechanical strength and moldability are deteriorated.

As the low molecular weight polyester compound (E) used in the present invention are preferred polyester compounds of terminal blocked type having an average molecular weight of 2,000 to 5,500 obtained from intrinsic viscosity according to Mark-Howink equation and prepared by a usual esterification method from a monomeric mixture containing a dihydric alcohol having 2 to 25 carbon atoms; an aromatic polybasic acid having at least three carboxyl groups, or either or both of an aliphatic dibasic acid having 4 to 14 carbon atoms and an aromatic dibasic acid having 8 to 18 carbon atoms; and a monohydric alcohol having 4 to 18 carbon atoms. If the terminal group of the low molecular weight polyester compound is not blocked with a monofunctional alcohol or acid component or the like, it may cause a transesterification with the polyester resin (A), resulting in lowering of mechanical strength. If the average molecular weight of the polyester compound (E) is less than 2,000, the mechanical strength is lowered, and if the average molecular weight is more than 5,500, the dispersibility of the conductive carbon black is not improved and the plastication characteristics are also deteriorated.

Examples of the dihydric alcohol having 2 to 25 carbon atoms used in the preparation of the low molecular weight polyester compound (E) are, for instance, ethylene glycol, propylene glycol, butanediol, 2-methyl-1,3-propanediol, pentanediol, 3-methyl-1,5-pentanediol, hexanediol, 2-methyl-1,8-octanediol, decanediol, neopentyl glycol, diethylene glycol, dipropylene glycol, cyclohexanedimethanol, cyclohexanediol, bisphenol A, and the like.

Examples of the aromatic polybasic acid having at least three carboxyl groups, the aliphatic dibasic acid having 4 to 14 carbon atoms and the aromatic dibasic acid having 8 to 18 carbon atoms are, for instance, trimellitic acid, trimesic acid, pyromellitic acid, adipic acid, sebacid acid, azelaic acid, dodecanedioic acid, phthalic acid, isophthalic acid, terephthalic acid, 2,6-naphthalenedicarboxylic acid, 1,4-cyclohexanedicarboxylic acid, 1,3-cyclohexanedicarboxylic acid, and the like.

Examples of the monohydric alcohol having 4 to 18 carbon atoms used in the preparation of the low molecular weight polyester compound (E) are, for instance, butanol, hexanol, isohexanol, heptanol, octanol, isooctanol, 2-ethylhexanol, decanol, dodecanol, hexadecanol, cyclohexanol, benzyl alcohol, phenylethanol, phenoxyethanol, 2-hydroxyethyl benzyl ether, and the like.

One or more members are selected from the respective components used in the low molecular weight polyester compound (E).

In particular, from the viewpoint of a balance between the mechanical strength and improvements in electric characteristics and plastication characteristics, it is preferable to use a low molecular weight polyester compound prepared from a combination of ethylene glycol or butanediol as the dihydric alcohol, terephthalic acid as the dibasic acid and 2-ethylhexanol as the monohydric alcohol.

The amount of the low molecular weight polyester compound (E) is from 0.05 to 30 parts by weight, preferably 0.1 to 25 parts by weight, more preferably 1 to 20 parts by weight, per 100 parts by weight of the thermoplastic polyester (A). If the amount is less than 0.05 part by weight, the electric characteristics are not sufficiently improved, so an increased amount of the conductive carbon black is required to obtain the desired electric resistance value. Increase in the amount of carbon black brings about not only deterioration of mechanical strength but also a variation in electric resistance value, so no resin composition having stable electric characteristics is obtained, and also the plastication characteristics are lowered. If the amount is more than 30 parts by weight, a stable electric resistance is obtained, but the mechanical strength of the obtained resin compositions is lowered since decomposition of the thermoplastic polyester may proceed.

The metal salt of an ionic hydrocarbon copolymer (F) used in the present invention is partial metal salts of copolymers of an $\alpha$-olefin and an $\alpha,\beta$-unsaturated carboxylic acid, typically inonic copolymers known as ionomers. Ionic copolymers containing a metal ion with a valency of 1 to 3 are preferably used. Examples of the $\alpha$-olefin are, for instance, ethylene, propylene, 1-butene, 1-octene, 1-hexene, styrene, $\alpha$-methylstyrene, and the like. The $\alpha$-olefin may be used alone or in admixture thereof. Examples of the $\alpha,\beta$-unsaturated carboxylic acid are, for instance, a monocarboxylic acid such as acrylic acid, methacrylic acid or crotonic acid, and a dicarboxylic acid such as maleic acid, fumaric acid or itaconic acid. The $\alpha,\beta$-unsaturated carboxylic acid may be used alone or in admixture thereof. The monovalent to trivalent metal ions include, for instance, $Na^+$, $K^+$, $Mg^{++}$, $Ca^{++}$, $Ba^{++}$, $Zn^{30 +}$ and $Al^{+++}$. It is preferable that 10 to 60% of the carboxyl groups present in the ionic hydrocarbon copolymer is neutralized with a metal ion.

The ionic copolymer (F) may contain a small amount of other copolymerizable vinyl monomers e.g., alkyl acrylates or methacrylates such as methyl acrylate, methyl methacrylate or butyl acrylate.

The ionic copolymers (F) may be used alone or in admixture thereof. The amount of the component (F) is from 0.1 to 5 parts by weight, preferably 0.3 to 4 parts by weight, more preferably 0.5 to 3 parts by weight, per 100 parts by weight of the thermoplastic polyester (A). If the amount is less than 0.1 part by weight, the electric resistance value is not stabilized, and stabilization of the plastication characteristics is also insufficient. If the amount is more than 5 parts by weight, the heat resistance and moldability are lowered.

In the present invention, it is preferable to incorporate the conductive carbon black (D), the low molecular weight polyester compound (E) and the metal salt of ionic hydrocarbon copolymer (F) into the resin composition so as to satisfy the following equation (1):

$$0.1 \leq \frac{\text{amount of }(D)}{\text{amount of }(E) + \text{amount of }(F)} \leq 2.0 \quad (1)$$

wherein all amounts are parts by weight (hereinafter the same), especially the following equation (3):

$$0.3 \leq \frac{\text{amount of }(D)}{\text{amount of }(E) + \text{amount of }(F)} \leq 1.7 \quad (3)$$

more especially the following equation (4):

$$0.4 \leq \frac{\text{amount of }(D)}{\text{amount of }(E) + \text{amount of }(F)} \leq 1.5 \quad (4)$$

If the ratio of (D) to the total amount of (E) and (F) is less than 0.1 by weight, the mechanical strength and heat resistance are lowered, and if the ratio is more than 2.0, the plastication characteristics are hard to be stabilized.

Further, in order to obtain more stable electric resistance value and plastication characteristics, it is preferable that the weight ratio of the low molecular weight polyester compound (E) to the ionic copolymer (F) falls within the range shown by the following equation (2):

$$0.1 \leq \frac{\text{amount of }(E)}{\text{amount of }(F)} \leq 6 \quad (2)$$

wherein all amounts are parts by weight, especially the following equation (5):

$$0.3 \leq \frac{\text{amount of }(E)}{\text{amount of }(F)} \leq 5 \quad (5)$$

more especially the following equation (6):

$$0.5 \leq \frac{\text{amount of }(E)}{\text{amount of }(F)} \leq 4 \quad (6)$$

If the (E)/(F) ratio is less than 0.1 by weight, the stability of the plastication characteristics is lowered, and if the (E)/(F) ratio is more than 6, the plastication characteristics become unstable and, in addition, the mechanical strength is lowered. Although the mechanism that these components (E) and (F) contribute to the antistatic property has not been made clear, it is presumed that these components (E) and (F) are uniformly dispersed into the matrix resin, polyester (A), by adjusting the ratio thereof within the specific range, whereby the dispersibility of the conductive carbon black (D) is improved and uniform network is formed to raise the antistatic property and to reduce a variation in electric resistance value, and as a result of uniform dispersion of the carbon black, the plastication characteristics of the resin composition is made uniform to stabilize the moldability.

The polyester resin composition of the present invention may further contain a reinforcing filler (G) in order to raise the mechanical strength and heat resistance. Reinforcing fillers conventionally used for polyester resins and others can be used in the present invention. Examples of the reinforcing filler are, for instance, glass fiber, carbon fiber, potassium titanate fiber, ceramic beads, glass beads, glass balloon, ceramic balloon, glass flack, calcium silicate, calcium carbonate, calcium sulfate, magnesium silicate, barium sulfate, mica, talc, kaolin, clay, and the like. The reinforcing fillers may be used alone or in admixture thereof.

In case of using fibrous reinforcing agents such as glass fiber and carbon fiber, it is preferable to use fibers treated with a roving sizing agent, from viewpoints of economy, workability and affinity with resins. In particular, in case of using a glass fiber as the reinforcing filler, those having a diameter of about 1 to about 20 μm and a length of about 0.01 to about 50 mm are preferred. If the fiber length is too short, the reinforcing effect is not sufficient, and if the fiber length is too long, the moldability and the surface property of moldings are deteriorated.

In order to raise an adhesion or affinity between resins and fibrous reinforcing agents, it is desirable to use fibrous reinforcing agents surface-treated with a coupling agent or a binder. Examples of the coupling agent are, for instance, an alkoxy silane compound such as γ-aminopropyltriethoxysilane or γ-glycidoxypropyltrimethoxysilane, and other known coupling agents. Examples of the binder are, for instance, epoxy resin, urethane resin and the like. These may be used alone or in admixture thereof.

The reinforcing filler (G) is used in an amount of 0 to 100 parts by weight, preferably 5 to 80 parts by weight, per 100 parts by weight of the thermoplastic polyester (A). If the amount of the reinforcing filler exceeds 100 parts by weight, the fluidity of the resin composition is greatly decreased, resulting in lowering of the moldability.

The polyester resin composition of the present invention may further contain a crystallizing accelerator (H) in order to improve the heat resistance. Known compounds used for acceleration of crystallization of polyester resins can be used. Examples of the accelerator (H) are, for instance, an organic acid salt such as sodium p-t-butylbenzoate, sodium montanate, calcium montanate, sodium palmitate or calcium stearate; an inorganic salt such as calcium carbonate, calcium silicate, magnesium silicate, calcium sulfate, barium sulfate or talc; a metal oxide such as zinc oxide, magnesium oxide or titanium oxide; a block copolymer comprising a polyester segment and a polyalkylene glycol segment such as polyethylene glycol, polypropylene glycol, poly(ethylene oxide-propylene oxide) block and/or random copolymer, polyoxyethylene bisphenol A ether or polytetramethylene glycol. The crystallizing accelerators may be used alone or in admixture thereof. Sodium p-t-butylbenzoate, sodium montanate and a block copolymer of ethylene terephthalate and polyoxyethylene bisphenol A ether are particularly preferred from the viewpoints of improvement in heat resistance and moldability.

The amount of the crystallizing accelerator (H) is selected so that the characteristics of the polyester resin composition according to the present invention are not impaired. Preferably, the crystallizing accelerator (H) is used in an amount of 0.01 to 5 parts by weight for the organic acid salt accelerator, 0.1 to 10 parts by weight for the inorganic salt accelerator, 0.1 to 10 parts by weight for the metal oxide accelerator, or 5 to 60 parts by weight for the block copolymer accelerator, respectively, per 100 parts by weight of the thermoplastic polyester (A).

In order to raise the mechanical strength, the polyester resin composition of the present invention may further contain a polyfunctional compound (I) which is reactive with polyester resins, e.g., a polyfunctional compound which has at least two functional groups capable of reacting with either of —OH group and —COOH group, and a compound which can be decomposed thermally or by other means to produce such functional groups. Examples of the functional group having a reactivity with a polyester are, for instance, epoxy group, carbodiimido group, oxazoline group, isocyanate group, carboxyl group, carboxylic anhydride group and acid halide compound. The functional group selected from the group consisting of epoxy group, carbodiimido group and oxazoline group is preferred from the viewpoints of the reactivity and a by-product resulting from the reaction.

Examples of the epoxy group-containing compound used as the component (I) are, for instance, bisphenol A epoxy resin, brominated bisphenol A epoxy resin, novolak type epoxy resin, a polyvalent, aliphatic, alicyclic or aromatic glycidyl ether compound, a polyvalent, aliphatic, alicyclic or aromatic glycidyl ester compound, an epoxy compound obtained by epoxidizing an aliphatic or alicyclic compound having a plurality of unsaturated bonds with acetic acid and peracetic acid, a polyvalent aliphatic, alicyclic or aromatic glycidyl amine compound, a copolymer of an olefin and glycidyl (meth)acrylate, and the like. Non-brominated or brominated bisphenol A epoxy resin, novolak type epoxy resin, a mixture thereof and an ethylene-glycidyl methacrylate-vinyl acetate copolymer are preferred from the viewpoint of a balance between physical properties of the obtained moldings. These preferred compounds are commercially available, for instance, under the trade mark "Epikote 828", "Epikote 152" (which are products of Yuka Shell Epoxy Kabushiki Kaisha) and "Bondfast 7B" (which is a product of Mitsui DuPond Polychemical Kabushiki Kaisha).

The carbodiimido group-containing compounds used as the component (I) are compounds having at least two carbodiimido groups of the formula: —N=C=N— in the molecule, and are produced, for instance, by heating an organic isocyanate in the presence of a suitable catalyst to undergo a decarboxylation reaction. Examples thereof are, for instance, a polycarbodiimide such as poly(1,6-hexamethylenedicarbodiimide) and an aromatic polycarbodiimide such as poly(diisopropylphenylenecarbodiimide). Aromatic polycarbodiimide polymers are preferred from the viewpoint of balance of physical properties, and they are commercially available under the trade mark "Stavacsol P" from Bayer A. G.

As the compound having at least two oxazoline groups in its molecule is preferred a difunctional oxazoline compound from the viewpoint of a balance of physical properties. For example, 2,2'-(1,3-phenylene)bis(2-oxazoline) is commercially available under the trade mark "1,3-PBO" from Takeda Chemical Industries, Ltd.

The polyfunctional compounds (I) may be used alone or in admixture thereof.

The amount of the polyfunctional compound (I) is from 0.05 to 5 parts by weight, preferably 0.1 to 3 parts by weight, more preferably 0.15 to 2 parts by weight, per 100 parts by weight of the thermoplastic polyester (A). If the amount is less than 0.05 part by weight, the effect of improving the mechanical strength of the obtained moldings is small, and if the amount is more than 5 parts by weight, the fluidity of the obtained resin composition is deteriorated to remarkably lower the moldability, and also the mechanical strength is rather deteriorated.

The flame retardant, antistatic polyester resin compositions of the present invention may contain an antioxidant, as occasion demands, in order to improve the heat stability. Known antioxidants can be used. Examples of the antioxidant are, for instance, a phenol antioxidant such as pentaerythrityl-tetrakis[3-(3,5-di-t-butyl-4-hydroxyphenyl) propionate, octadecyl-3-(3,5-di-t-butyl-4-hydroxyphenyl) propionate, 1,3,5-trimethyl-2,4,6-tris(3,5-di-t-butyl-4-hydroxybenzyl)benzene, n-octadecyl-3-(3',5'-di-t-butyl-4'-hydroxyphenyl)propionate, N,N'-bis-3-(3',5'-di-t-butyl-4-hydroxyphenyl)propionylhexamethylenediamine or tris(3,5-di-t-butyl-4-hydroxybenzyl)isocyanurate; a phosphorus antioxidant such as tris(2,4-di-t-butylphenyl)phosphite, distearylpentaerythritoldiphosphite or bis(2,6-di-t-butyl-4-methylphenyl)pentaerythritol-di-phosphite; a thioether antioxidant such as distearyl-3,3'-thiodipropionate or pentaerythritol-tetrakis($\beta$-laurylthiopropionate); and the like. The antioxidants may be used alone or in admixture thereof.

Further, the compositions of the present invention may contain one or more of other usual additives, as occasion demands, e.g., lubricant, releasing agent, plasticizer, ultraviolet absorber, light stabilizer, pigment, dye, dispersing agent, compatibilizer, antibacterial agent and antidropping agent.

The compositions of the present invention may contain one or more of other suitable thermoplastic or thermosetting resins so long as the effects of the present invention are not impaired, e.g., unsaturated polyester, liquid crystalline polyester, polyester-ester elastomer, polyester-ether elastomer, polyolefin, polystyrene, polyamide, polycarbonate, elastomer-reinforced styrene resin, polyphenylene sulfide resin, polyphenylene ether resin, polyacetal, polysulfone, and polyarylate.

The method for preparing the polyester resin compositions of the present invention is not particularly limited and, for example, the compositions can be prepared by such a method that after drying the above-mentioned components (A) to (F) and optionally one or more of the components (G), (H) and (I) and further optionally other additives or resins, they are melt-kneaded by a melt-kneading machine such as a single-screw or twin-screw extruder.

The method for molding the polyester resin compositions of the present invention is not particularly limited, and molding methods generally used for molding thermoplastic resins are adoptable, e.g., injection molding, blow molding, extrusion, sheet forming, roll forming, press molding, laminated molding, film forming by melt casting, and spinning.

The present invention is more specifically explained by means of the following examples, in which all parts and % are by weight unless otherwise noted. It is to be understood that the present invention is not limited to these examples.

Reference Example 1
(Synthesis of Crystallizing Accelerator)

A 10 liter autoclave (made by Nippon Taiatsu Glass Kabushiki Kaisha) was charged with 3,500 g of a polyethylene terephthalate oligomer (average number of ethylene terephthalate units: about 5 to about 8) synthesized by using antimony trioxide as a catalyst, 1,500 g of polyoxyethylene bisphenol A ether having an average molecular weight of about 1,000, and 25 g of a phenol stabilizer commercially available under the trade mark "Adekastab AO-60" made by Asahi Denka Kogyo Kabushiki Kaisha. After raising the temperature to 290° C. with stirring in a nitrogen stream, the inner pressure was reduced to less than 133 Pa (1 Torr). The mixture was further stirred for 3 hours after reaching to less than 133 Pa, and the inner pressure was returned back to atmospheric pressure by introducing nitrogen gas to finish the polymerization. The obtained copolymer has a logarithmic viscosity of 0.7 dl/g and was used as a crystallizing accelerator H-1.

EXAMPLE 1

There were mixed 100 parts of a polyethylene terephthalate having a logarithmic viscosity of 0.6 dl/g as the thermoplastic polyester (A-1), 10 parts of brominated diphenylethane (trade mark "Saytex 8010", product of Albemarle Kabushiki Kaisha, bromine content 82%) as the bromine-containing flame retardant (B-1), 1.5 parts of antimony trioxide (trade mark "Sanka Antimon C", product of Sumitomo Metal Mining Co.,Ltd.) as the antimony compound (C-1), 4.5 parts of conductive carbon black (D-1) (trade mark "Ketjen black EC600JD", product of Ketjen Black International Co.), 6 parts of polybutylene terephthalate-2-ethylhexyl ester having an average molecular weight of 3,800 as the low molecular weight polyester compound (E-2), 3 parts of a partial sodium metal salt of ethylene-methacrylic acid copolymer (trade mark "Himilan 1707", product of Mitsui DuPont Polychemical Co., Ltd., degree of neutralization of carboxyl group by sodium ion 50%) as the ionic hydrocarbon copolymer metal salt (F-1), 20 parts of the copolymer prepared in Reference Example 1 as the crystallizing accelerator (H-1), 0.2 part of sodium p-t-butylbenzoate (trade mark "Nonsurl TBAN", product of NOF Corporation) as the crystallizing accelerator (H-2), 0.1 part of polyfunctional compound (I-1) (trade mark "Bisox-azoline 1,3-PBO", product of Takeda Chemical Industries, Ltd.) and 0.5 part of an antioxidant (trade mark "Irganox 1010", product of Ciba Speciality Chemicals Kabushiki Kaisha). The mixture was fed from a hopper of a twin-screw extruder equipped with a vent (TEX 44 made by The Japan Steel Works, Ltd.) set at a barrel temperature of 280° C. The mixture was melt-extruded to give a resin composition, while 40 parts of a glass fiber (T-195H made by Nippon Electric Glass Co., Ltd.) as the fibrous reinforcing agent (G-1) was fed from a side feeder of the extruder.

In order to evaluate a variation of electric characteristics of the composition, sampling was made at the starting, middle and finishing points of the extrusion and the electrical resistivity thereof was measured.

The resin composition was evaluated as follows:
Preparation of Test Specimens

After drying the resin composition at 140° C. for 4 hours, bar specimens having a thickness of 0.8 mm, 1.6 mm and 6.4 mm (width 12.7 mm, length 127 mm) and ASTM No. 1 dumbbell specimens having a thickness of 3.2 mm were prepared by a 80 t injection molding machine at a cylinder temperature of 280° C. and a mold temperature of 60° C. Also, flat plate specimens having a size of 120 mm×120 mm×3 mm were prepared by a 75 t injection molding machine at a cylinder temperature of 270° C. and a mold temperature of 90° C. These test specimens were used for the following tests.
Flame Resistance Using the 0.8 mm thick bar and the 1.6 mm thick bar, the flame resistance was evaluated according to a vertical burning testing method provided in UL-94.
Surface Resistivity A conductive resin (trade mark "Dotite D-550", product of Fujikura Kasei Kabushiki Kaisha) was coated onto the surface of the dumbbell specimen at two points thereof (coating area 12.5 mm×16 mm) at an interval of 8 mm, and dried to give electrodes. The resistivity (R) between the electrodes was measured by a tester, and the surface resistivity was calculated according to the following equation (7):

$$\text{Surface resistivity } (\Omega/\square) = R \times 12.5/8 \quad (7)$$

Volume Resistivity

Using the plate specimen, the volume resistivity was obtained according to ASTM D-257.

Tensile Strength

Using the 3.2 mm thick dumbbell specimen, tensile test was conducted according to ASTM D-638, and the maximum strength was obtained.
Flexural Strength Using the 6.4 mm thick bar specimen, flexural test was conducted according to ASTM D-790, and the maximum strength was obtained.
Heat Resistance Using the 6.4 mm thick bar specimen, temperature of deflection under load of 1.82 MPa (HDT) was measured according to ASTM D-648.
Plastication Characteristics In order to evaluate the stability of the plastication characteristics, 20 shot continuous molding was carried out by using a 75 t injection molding machine under conditions of cylinder temperature 280° C. and number of rotations of screw 40 r.p.m., and the metering time (second) of each shot was measured. The plastication characteristics were evaluated by a difference between the maximum and minimum values.

EXAMPLES 2 TO 9

According to the recipes shown in Table 1, resin compositions were prepared and evaluated in the same manner as in Example 1.

The detail of the ingredients used is as follows:
(A-2) Thermoplastic polyester: polytetramethylene terephthalate having an intrinsic viscosity of 0.9
(B-2) Bromine-containing flame retardant: brominated polystyrene (trade mark "PYRO-CHEK 68PB", product of Nissan Ferro Yuki Kagaku Kabushiki Kaisha, bromine content 68%)
(B-3) Bromine-containing flame retardant: brominated phenoxy resin (trade mark "Phenotohto YPB-43MK", product of Tohto Kasei Kabushiki Kaisha, bromine content 58%)
(C-2) Antimony compound: sodium antimonate (trade mark "Sun Epoch NA107OL", product of Nissan Kagaku Kogyo Kabushiki Kaisha)
(D-2) Conductive carbon black: carbon black (trade mark "Ketjen Black EC", product of Ketjen Black International Co.)
(E-1) Low molecular weight polyester compound: polybutylene terephthalate-2-ethylhexyl ester having an average molecular weight of 2,600
(E-3) Low molecular weight polyester compound: polybutylene terephthalate-2-ethylhexyl ester having an average molecular weight of 5,800
(F-2) Metal salt of ionic hydrocarbon copolymer: partial sodium salt of ethylene-methacrylic acid copolymer (trade mark "Himilan 1605", product of Mitsui DuPont Polychemical Co., Ltd., degree of neutralization 30%)
(G-2) Reinforcing filler: mica (trade mark "Mica powder A-41S", product of Yamaguchi Unmo Kogyosho Kabushiki Kaisha)
(I-2) Polyfunctional compound: epoxy resin (trade mark "Epikote 828", product of Yuka Shell Epoxy Kabushiki Kaisha, epoxy equivalent 185)
(I-3) Polyfunctional compound: aromatic polycarbodiimide (trade mark "Stavacsol P", product of Bayer AG)

Comparative Example 1

The procedure of Example 1 was repeated to give a resin composition containing 100 parts of a polyethylene terephthalate having a logarithmic viscosity of 0.6 as the thermoplastic polyester (A-1), 10 parts of brominated diphenylethane (trade mark "Saytex 8010", product of Albemarle Kabushiki Kaisha, bromine content 82%) as the bromine-containing flame retardant (B-1), 1.5 parts of antimony trioxide (trade mark "Sanka Antimon C", product of Sumitomo Metal Mining Co.,Ltd.) as the antimony compound (C-1), 4.5 parts of coductive carbon black (D-1) (trade mark "Ketjen black EC600JD", product of Ketjen Black International Co.), 20 parts of the copolymer prepared in Reference Example 1 as the crystallizing accelerator (H-1), 0.2 part of sodium p-t-butylbenzoate (trade mark "Nonsurl TBAN", product of NOF Corporation) as the crystallizing accelerator (H-2), 0.1 part of polyfunctional compound (I-1) (trade mark "Bisoxazoline 1,3-PBO", product of Takeda Chemical Industries, Ltd.) and 0.5 part of an antioxidant (trade mark "Irganox 1010", product of Ciba Speciality Chemicals Kabushiki Kaisha).

Comparative Examples 2 to 6

According to the recipes shown in Table 1, resin compositions were prepared and evaluated in the same manner as in Example 1.

The detail of the ingredients used is as follows:
(A-2) Thermoplastic polyester: polytetramethylene terephthalate having an intrinsic viscosity of 0.9
(B-3) bromine-containing flame retardant: brominated phenoxy resin (trade mark "Phenotohto YPB-43MK", product of Tohto Kasei Kabushiki Kaisha, bromine content 58%)
(E-1) Low molecular weight polyester compound: polybutylene terephthalate-2-ethylhexyl ester having an average molecular weight of 2,600
(E-2) Low molecular weight polyester compound: polybutylene terephthalate-2-ethylhexyl ester having an average molecular weight of 3,800
(F-1) Metal salt of ionic hydrocarbon copolymer: partial sodium salt of ethylene-methacrylic acid copolymer (trade mark "Himilan 1707", product of Mitsui DuPont Polychemical Co., Ltd., degree of neutralization 50%)

The results of Examples 1 to 9 and Comparative Examples 1 to 6 are shown in Table 1. The resistivity values shown in Table 1 are volume resistivity ($\Omega \cdot cm$) for Examples 1, 2, 5 and 7–9 and Comparative Examples 1, 2 and 6, and surface resistivity ($\Omega/\square$) for Examples 3, 4 and 6 and Comparative Examples 3 to 5.

As apparent from Table 1, the compositions of the present invention exhibit an improved antistatic property, while maintaining high flame resistance, mechanical strength and heat resistance. Further, they are excellent in stability in electric resistance value with the lapse of time in preparation of the compositions by an extruder, and are also improved in the stability in plastication in molding processing. As apparent from comparison between Example 1 and Examples 7 and 8, the mechanical strength or the heat stability of the compositions can be further improved without impairing the stability in flame resistance and antistatic property by incorporating crystallizing accelerator (H) and polyfunctional compound (I). Further, as apparent from comparison between Example 1 and Example 9, the plastication characteristics and the stability in antistatic property can be further improved without lowering the flame resistance and mechanical strength by using low molecular weight polyester compound (E) having a molecular weight within a specific range.

TABLE 1

|  | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- |
| (A-1) Polyethylene terephthalate | 100 | 100 | 100 | 100 | 30 | — | 100 | 100 | 100 |
| (A-2) Polytetramethylene terephthalate | — | — | — | — | 70 | 100 | — | — | — |
| (B-1) Brominated diphenylethane | 10 | — | — | 15 | 20 | — | 10 | 10 | 10 |
| (B-2) Brominated polystyrene | — | 29 | 28 | — | — | — | — | — | — |
| (B-3) Brominated phenoxy resin | — | — | — | — | — | 30 | — | — | — |
| (C-1) Antimony trioxide | 1.5 | 2.5 | — | — | — | 0.8 | 1.5 | 1.5 | 1.5 |
| (C-2) Sodium antimonate | — | — | 1.5 | 1.2 | 0.9 | — | — | — | — |
| (D-1) Ketjen black EC600JD | 4.5 | 5 | — | — | 4 | 10 | 4.5 | 4.5 | 4.5 |
| (D-2) Ketjen black EC | — | — | 12 | 8 | — | — | — | — | — |
| (E-1) Low M.W. polyester (Mn = 2600) | — | 12 | 18 | — | 1.8 | — | — | — | — |
| (E-2) Low M.W. polyester (Mn = 3800) | 6 | — | — | 2 | — | 23 | 6 | 6 | — |
| (E-3) Low M.W. polyester (Mn = 5800) | — | — | — | — | — | — | — | — | 6 |
| (F-1) Ionomer (Himilan 1707) | 3 | — | 4.5 | 3 | 0.3 | 4 | 3 | 3 | 3 |
| (F-2) Ionomer (Himilan 1605) | — | 2 | — | — | — | — | — | — | — |
| (G-1) Glass fiber | 40 | 40 | 40 | 40 | 40 | 40 | 40 | 40 | 40 |
| (G-2) Mica | — | — | — | 15 | — | — | — | — | — |
| (H-1) Copolymer of Ref. Ex. 1 | 20 | 20 | 20 | — | — | — | 20 | — | 20 |
| (H-2) Sodium p-t-butylbenzoate | 0.2 | 0.2 | 0.2 | 0.2 | — | — | 0.2 | — | 0.2 |
| (I-1) Bisoxazoline | 0.1 | — | — | 0.2 | 0.2 | — | — | 0.1 | — |
| (I-2) Epoxy resin Epikote 828 | — | 0.2 | 0.2 | — | — | — | — | — | 0.1 |
| (I-3) Aromatic polycarbodiimide | — | — | — | — | — | 0.1 | — | — | — |
| Antioxidant Irganox 1010 | 0.5 | 0.5 | 0.5 | 0.5 | 0.5 | 0.5 | 0.5 | 0.5 | 0.5 |
| Flame resistance | V-0 | V-0 | V-0 | V-0 | V-0 | V-0 | V-0 | V-0 | V-0 |
| Electrical resistivity |  |  |  |  |  |  |  |  |  |
| Starting point | 1E+11 | 1E+10 | 1E+03 | 1E+04 | 1E+11 | 1E+02 | 1E+11 | 1E+11 | 1E+12 |
| Middle point | 1E+11 | 1E+10 | 1E+03 | 1E+04 | 1E+11 | 1E+02 | 1E+11 | 1E+11 | 1E+11 |
| Finishing point | 1E+11 | 1E+10 | 1E+03 | 1E+04 | 1E+11 | 1E+02 | 1E+11 | 1E+11 | 1E+11 |
| Plastication characteristics (sec.) | 1.3 | 1.6 | 2.3 | 2.8 | 0.5 | 2.0 | 1.4 | 1.5 | 9.5 |
| Tensile strength (kg/cm$^2$) | 1100 | 1000 | 900 | 1100 | 1000 | 1200 | 1000 | 1050 | 1150 |
| Flexural strength (kg/cm$^2$) | 1500 | 1450 | 140 | 1500 | 1450 | 1600 | 1400 | 1450 | 1550 |
| HDT (° C.) | 210 | 210 | 210 | 210 | 205 | 190 | 205 | 200 | 210 |

|  | Com. Ex. 1 | Com. Ex. 2 | Com. Ex. 3 | Com. Ex. 4 | Com. Ex. 5 | Com. Ex. 6 |
| --- | --- | --- | --- | --- | --- | --- |

TABLE 1-continued

| | | | | | | |
|---|---|---|---|---|---|---|
| (A-1) Polyethylene terephthalate | 100 | 100 | 100 | 100 | — | — |
| (A-2) Polytetramethylene terephthalate | — | — | — | — | 100 | 100 |
| (B-1) Brominated diphenylethane | 10 | 10 | 10 | 10 | — | — |
| (B-2) Brominated polystyrene | — | — | — | — | — | — |
| (B-3) Brominated phenoxy resin | — | — | — | — | 35 | 30 |
| (C-1) Antimony trioxide | 1.5 | 1.5 | 1.5 | 1.5 | 0.5 | 0.8 |
| (C-2) Sodium antimonate | — | — | — | — | — | — |
| (D-1) Ketjen black EC600JD | 4.5 | 4.5 | 4.5 | 3.5 | 15 | 2 |
| (D-2) Ketjen black EC | — | — | — | — | — | — |
| (E-1) Low M.W. polyester (Mn = 2600) | — | — | — | 35 | — | — |
| (E-2) Low M.W. polyester (Mn = 3800) | — | 0.5 | — | — | 23 | 23 |
| (E-3) Low M.W. polyester (Mn = 5800) | — | — | — | — | — | — |
| (F-1) Ionomer (Himilan 1707) | — | — | 7 | 5 | 4 | 4 |
| (F-2) Ionomer (Himilan 1605) | — | — | — | — | — | — |
| (G-1) Glass fiber | 40 | 40 | 40 | 40 | 40 | 40 |
| (G-2) Mica | — | — | — | — | — | — |
| (H-1) Copolymer of Ref. Ex. 1 | 20 | 20 | 20 | 20 | — | — |
| (H-2) Sodium p-t-butylbenzoate | 0.2 | 0.2 | 0.2 | 0.2 | — | — |
| (I-1) Bisoxazoline | 0.1 | 0.1 | 0.1 | 0.1 | 0.2 | 0.2 |
| (I-2) Epoxy resin Epikote 828 | — | — | — | — | — | — |
| (I-3) Aromatic polycarbodiimide | — | — | — | — | — | — |
| Antioxidant Irganox 1010 | 0.5 | 0.5 | 0.5 | 0.5 | 0.5 | 0.5 |
| Flame resistance | V-0 | V-0 | V-0 | V-0 | NotV | V-0 |
| Electrical resistivity | | | | | | |
| Starting point | 1E+14 | 1E+12 | 1E+05 | 1E+04 | 1E+02 | 1E+16 |
| Middle point | 1E+12 | 1E+13 | 1E+03 | 1E+04 | 1E+02 | 1E+16 |
| Finishing point | 1E+11 | 1E+10 | 1E+04 | 1E+04 | 1E+03 | 1E+15 |
| Plastication characteristics (sec.) | 26.5 | 25.0 | 31.3 | 16.0 | 33.0 | 1.5 |
| Tensile strength (kg/cm$^2$) | 1100 | 950 | 850 | 650 | 650 | 1100 |
| Flexural strength (kg/cm$^2$) | 1500 | 1350 | 1300 | 1000 | 900 | 1450 |
| HDT (° C.) | 210 | 210 | 195 | 195 | 180 | 180 |

What we claim is:

1. A flame retardant antistatic polyester resin composition comprising:
   (A) a thermoplastic polyester,
   (B) 1 to 35 parts of a bromine-containing flame retardant,
   (C) 0.1 to 5 parts of an antimony compound,
   (D) 3 to 12 parts of a conductive carbon black,
   (E) 0.05 to 30 parts of a low molecular weight polyester compound having an average molecular weight of 2,000 to 5,500 obtained from intrinsic viscosity according to Mark-Howink equation, and
   (F) 0.1 to 5 parts of a metal salt of an ionic hydrocarbon copolymer, wherein said all parts of (B) to (F) are parts by weight per 100 parts by weight of said polyester (A).

2. The composition of claim 1, wherein said conductive carbon black has a weight ratio to a sum of said low molecular weight polyester compound and said metal salt of an ionic hydrocarbon copolymer of from 0.1 to 2.0.

3. The composition of claim 1, wherein said low molecular weight polyester compound has a weight ratio to said metal salt of an ionic hydrocarbon copolymer of from 0.1 to 6.

4. The composition of claim 1, wherein the weight ratio of the Br content in the composition derived from said bromine-containing flame retardant (B) to the Sb content in the composition derived from said antimony compound (C) is from 5.5/1 to 35.0/1.

5. The composition of claim 1, further comprising a reinforcing filler.

6. The composition of claim 1, further comprising a crystallizing accelerator.

7. The composition of claim 1, further comprising a polyfunctional compound which has at least two functional groups capable of reacting with either of —OH group or —COOH group or which can be decomposed to produce at least two functional groups capable of reacting with either of —OH group or —COOH group.

8. The composition of claim 1, wherein said thermoplastic polyester is a terephthalic acid-based polyester resin derived from an acid component comprising terephthalic acid or an ester-formable derivative thereof and a glycol component comprising a glycol having 2 to 10 carbon atoms or an ester-formable derivative thereof.

9. The composition of claim 1, wherein said low molecular weight polyester compound is a polyester having an average molecular weight of 2,000 to 5,500 obtained from intrinsic viscosity according to Mark-Howink equation, which is derived from a raw material comprising (a) a dihydric alcohol having 2 to 25 carbon atoms, (b) an aromatic polybasic acid having at least three carboxyl groups, or at least one of an aliphatic dibasic acid having 4 to 14 carbon atoms and an aromatic dibasic acid having 8 to 18 carbon atoms, and (c) a monohydric alcohol having 4 to 18 carbon atoms.

10. The composition of claim 1, wherein said metal salt of an ionic hydrocarbon copolymer is a copolymer of an α-olefin and an α,β-unsaturated carboxylic acid in which 10 to 60% of the carboxyl groups are neutralized with a metal ion having a valency of 1 to 3.

11. A flame retardant antistatic polyester resin composition comprising:
   (A) a thermoplastic polyester,
   (B) 1 to 35 parts of a bromine-containing flame retardant,
   (C) 0.1 to 5 parts of an antimony compound,
   (D) 3 to 12 parts of a conductive carbon black,
   (E) 0.05 to 30 parts of a low molecular weight polyester compound, and
   (F) 0.1 to 5 parts of a metal salt of an ionic hydrocarbon copolymer, wherein said metal salt of an ionic hydrocarbon copolymer is a copolymer of an α-olefin and an α,β-unsaturated carboxylic acid in which 10 to 60% of the carboxyl groups are neutralized with a metal ion having a valency of 1 to 3, said α-olefin being at least one member selected from the group consisting of ethylene, propylene, 1-butene, 1-octene and 1-hexene, and said all parts of (B) to (F) are parts by per 100 parts by weight of said polyester (A).

12. The flame retardant antistatic polyester composition of claim 11, wherein said low molecular weight polyester compound has an average molecular weight of 2,000 to 5,500 obtained from intrinsic viscosity according to Mark-Howink equation.

* * * * *